Patented June 15, 1954

2,681,331

UNITED STATES PATENT OFFICE 2,681,331

SYNTHETIC RUBBERY TRIPOLYMERS OF BUTADIENE, ALKYL-BUTADIENES, AND VINYL PYRIDINES

Louis H. Howland, Watertown, and Victor S. Chambers, Naugatuck, Conn., assignors to United States Rubber Company, New York, N. Y., a corporation of New Jersey No Drawing. Application July 30, 1951, Serial No. 239,397

3 Claims. (Cl. 260—80.7)

This invention relates to the manufacture of so-called Arctic rubber or synthetic rubber having satisfactory physical properties at very low (sub-zero) temperatures, and also having satisfactory physical properties at ordinary (room and elevated) temperatures.

Synthetic rubber emulsion polymerizates of mixtures of 85 to 95 parts (all parts and percentages herein are by weight) of butadiene-1,3- (commonly called butadiene) with correspondingly 15 to 5 parts of a monovinyl pyridine or a monoalkyl monovinyl pyridine or a dialkyl monovinyl pyridine (so-called Arctic rubbers) have been recommended for the manufacture of articles, such as tires, that are to be used at very low temperatures in the range down to $-70°$ F. While conventional compounds from these synthetic rubbers have better flexibility and resilience at low temperatures than compounds from emulsion polymerized mixtures of 70–75 parts of butadiene and 30–25 parts of the vinyl pyridine, the physical properties at room and elevated temperature are far inferior to those synthetic rubbers having the higher content of the vinyl pyridine.

The present invention relates to the manufacture of synthetic rubbers which will maintain the improved low temperature physical properties of the so-called Arctic rubber emulsion polymerizates of 85–95 parts of butadiene and 15 to 5 parts of a monovinyl pyridine or a monoalkyl monovinyl pyridine or a dialkyl monovinyl pyridine while vastly improving the physical properties at ordinary (room and elevated) temperatures.

We have found that synthetic rubbers prepared by the emulsion polymerization of 85 to 95 parts of a mixture of butadiene-1,3 and 2,3-dialkyl-butadiene-1,3 and correspondingly 15 to 5 parts of a monovinyl pyridine or a monoalkyl monovinyl pyridine or a dialkyl monovinyl pyridine and in which the amount of 2,3-dialkylbutadiene-1,3 is 5 to 50% of the diene mixture, retain the desirable low temperature properties of similarly prepared binary copolymers of butadiene-1,3 and the vinyl pyridine having the same low content of the vinyl pyridine, but show greatly improved physical characteristics thereover at room and elevated temperatures. Examples of the vinyl pyridine which may be copolymerized with the mixture of butadiene and 2,3-dialkyl-butadiene according to the present invention are 2-vinyl pyridine (or alpha vinyl pyridine), 3-vinyl pyridine (or beta vinyl pyridine), 4-vinyl pyridine (or gamma vinyl pyridine), 2-methyl-5-vinyl pyridine, 5-ethyl-2-vinyl pyridine, 2,4-dimethyl-6-vinyl pyridine, 2,4-diethyl-6-vinyl pyridine. The presently preferred 2,3-dialkyl-butadiene is 2,3-dimethylbutadiene for economic reasons, but other 2,3-dialkylbutadienes, such as 2-methyl-3-ethyl butadiene, 2-methyl-3-butyl butadiene, and 2,3-diethyl butadiene may be used.

The butadiene and 2,3-dimethylbutadiene-1,3 and vinyl pyridine terpolymer and other terpolymers of the present invention may be polymerized in aqueous emulsion at conventional polymerization temperatures (generally 0° F. to 150° F., using antifreeze, such as methanol at the low temperatures), and in the presence of conventional emulsifying agents, initiators or catalysts, activators, modifiers or regulators, such as are used in conventional synthetic rubber emulsion-polymerizations.

The invention is illustrated in the following: 90 parts of butadiene and 10 parts of 2-vinyl pyridine in one batch and 80 parts of butadiene, 10 parts of 2,3-dimethylbutadiene-1,3 and 10 parts of 2-vinyl pyridine in a second batch were separately emulsion-polymerized to about 60% conversion at 41° F. according to the following recipe: polymerizable monomers (100 parts), fatty acid soap emulsifier (5 parts), diisopropyl benzene hydroperoxide or cumene hydroperoxide catalyst (0.15 part), tetraethylene pentamine activator (0.08 part), sodium salt of naphthalene sulfonic acid condensed with formaldehyde-stabilizer (1 part), mixed dodecyl, tetradecyl and hexadecyl mercaptan modifier (0.24 to 0.3 part), water (200 parts). The second-order transition temperature of the binary butadiene-2-vinyl pyridine copolymer is $-78°$ C., and of the butadiene-2,3-dimethylbutadiene - 2 - vinyl pyridine terpolymer is $-74°$ C., indicating that low temperature flexibility and resilience of vulcanizates made from each of the synthetic rubbers will be satisfactory and practically the same. Conventional tire tread compounds (100 parts of synthetic rubber, 50 parts of carbon black, 5 parts of tar softener, 5 parts of zinc oxide, 1.7 parts of sulfur, 0.2 part of accelerator) were made from the butadiene-2-vinyl pyridine binary copolymer and the butadiene-2,3-dimethylbutadiene-2-vinyl pyridine terpolymer synthetic rubbers and vulcanized at 292° F. Physical tests were run on each of the vulcanizates as follows:

|  | 90 butadiene-10 vinyl pyridine binary copolymer | 80 butadiene-10 2,3-dimethyl butadiene-10 vinyl pyridine terpolymer |
| --- | --- | --- |
| Avg. 300% Modulus, p. s. i. (75° F.) | 1,210 | 1,030 |
| Avg. Tensile, p. s. i. (75° F.) | 3,000 | 3,800 |
| Avg. Elongation, percent (75° F.) | 570 | 680 |
| Heat build-up, ° F. (Goodrich Flexometer): | | |
| Cure Times, 15' | 192 | 102 |
| Cure Times, 30' | 165 | 87 |
| Cure Times, 60' | 112 | 98 |
| Torsional Hysteresis: | | |
| Cure Times, 30' | .274 | .217 |
| Cure Times, 45' | .274 | .206 |
| Cure Times, 60' | .239 | .203 |
| Cure Times, 90' | .221 | .191 |
| Resilience, percent rebound (60' cures): | | |
| at 25° C | 47 | 49 |
| at 100° C | 51 | 58 |

The above data show that the butadiene-2,3-dimethylbutadiene-2-vinyl pyridine terpolymer gave a tread vulcanizate with greater tensile strength, less tendency to generate heat on distortion and better resilience at room and elevated temperatures than did the butadiene-2-vinyl pyridine binary copolymer, as well as being equivalent in physical properties at very low temperatures as shown by the second order transition temperatures.

Other butadiene - 2,3 - dimethylbutadiene-2-vinyl pyridine synthetic rubbers according to the present invention which showed similar advantages over butadiene-2-vinyl pyridine copolymers of similar 2-vinyl pyridine content were synthetic rubbers made by emulsion polymerization at 41° F. of 75 parts of butadiene and 15 parts of 2,3-dimethylbutadiene and 10 parts of 2-vinyl pyridine, by emulsion polymerization at 41° F. of 75 parts of butadiene and 20 parts of 2,3-dimethylbutadiene and 5 parts of 2-vinyl pyridine, by emulsion polymerization at 41° F. of 70 parts of butadiene and 20 parts of 2,3-dimethylbutadiene and 10 parts of 2-vinyl pyridine, and by emulsion polymerization at 113° F. of 80 parts of butadiene and 10 parts of 2,3-dimethylbutadiene and 10 parts of 2-vinyl pyridine. Similarly other vinyl pyridines such as 3-vinyl pyridine, 4-vinyl pyridine, and the various mono- and di-alkyl monovinyl pyridines, e. g. the mono- and di-methyl and mono- and di-ethyl monovinyl pyridines, such as 2-methyl-5-vinyl pyridine, 5-ethyl-2-vinyl pyridine, 2,4-dimethyl-6-vinyl pyridine and 2,4-diethyl-6-vinyl pyridine, may be copolymerized in amounts from 5 to 15 parts with 95 to 85 parts of a mixture of butadiene and 2,3-dimethylbutadiene containing 5 to 50% of the 2,3-dimethylbutadiene according to the present invention.

In view of the many changes and modifications that may be made without departing from the principles underlying the invention, reference should be made to the appended claims for an understanding of the scope of the protection afforded the invention.

Having thus described our invention what we claim and desire to protect by Letters Patent is:

1. A synthetic rubber aqueous emulsion polymerizate of polymerizable monomers consisting of about 80 parts by weight of butadiene-1,3, about 10 parts by weight of 2,3-dialkylbutadiene-1,3 in which the alkyl substituents have 1 to 4 carbon atoms and about 10 parts by weight of a vinyl pyridine selected from the group consisting of unsubstituted monovinyl pyridines and monoalkyl monovinyl pyridines and dialkyl monovinyl pyridines in which the alkyl substitutents have 1 to 2 carbon atoms.

2. A synthetic rubber aqueous emulsion polymerizate of polymerizable monomers consisting of about 80 parts by weight of butadiene-1,3, about 10 parts by weight of 2,3-dimethylbutadiene-1,3 and about 10 parts by weight of a vinyl pyridine selected from the group consisting of unsubstituted monovinyl pyridines and monoalkyl monovinyl pyridines and dialkyl monovinyl pyridines in which the alkyl substituents have 1 to 2 carbon atoms.

3. A synthetic rubber aqueous emulsion polymerizate of polymerizable monomers consisting of about 80 parts by weight of butadiene-1,3, about 10 parts by weight of 2,3-dimethylbutadiene-1,3 and about 10 parts by weight of 2-vinyl pyridine.

References Cited in the file of this patent

UNITED STATES PATENTS

| Number | Name | Date |
| --- | --- | --- |
| 2,384,546 | Fryling | Sept. 11, 1945 |
| 2,402,020 | Cislak | June 11, 1946 |
| 2,601,632 | Reynolds | June 24, 1952 |